United States Patent [19]

Sargent et al.

[11] Patent Number: 4,549,686
[45] Date of Patent: Oct. 29, 1985

[54] VAPOR PHASE SOLDERING USING PERFLUOROTETRADECAHYDROPHENANTHRENE ($C_{14}F_{24}$)

[75] Inventors: Colin R. Sargent, Nailsea; Keith Brierley, Bristol; David E. M. Wotton, Stoke Bishop; Paul L. Coe, Northfield, all of England

[73] Assignee: I.S.C. Chemicals Limited, London, England

[21] Appl. No.: 605,410

[22] Filed: Apr. 30, 1984

[30] Foreign Application Priority Data

May 6, 1983 [GB] United Kingdom ............... 8312503

[51] Int. Cl.⁴ .............................................. B23K 3/00
[52] U.S. Cl. .................................. 228/242; 228/37; 228/180.1; 357/82
[58] Field of Search .................. 228/37, 242, 180.1, 228/183; 357/82

[56] References Cited

U.S. PATENT DOCUMENTS

| Re. 30,399 | 9/1980 | Ammann et al. | 228/37 |
| 4,106,557 | 8/1978 | Sonobe et al. | 357/82 |
| 4,187,974 | 2/1980 | Mahajan | 228/242 |

Primary Examiner—Nicholas P. Godici
Assistant Examiner—K. Frederick Berg
Attorney, Agent, or Firm—Holman & Stern

[57] ABSTRACT

A method of soldering wherein a component or components to be soldered, such as a printed circuit board and soldered preforms, are immersed in a vapor bath to melt the solder, following which the components are withdrawn from the vapor bath. In the method according to the invention, the vapor bath is composed predominantly of perfluorotetradecahydrophenanthrene ($C_{14}F_{24}$).

3 Claims, No Drawings

VAPOR PHASE SOLDERING USING PERFLUOROTETRADECAHYDROPHENANTHRENE ($C_{14}F_{24}$)

This invention relates to the technique known as vapour phase soldering or "condensation re-flow soldering".

In such a technique, at least one component to be soldered is immersed in a vapour bath to melt the solder and cause it to flow, and the component is then withdrawn from the vapour bath. In one particular well-known application of this technique, electronic components incorporating soldered items such as pre-forms are assembled in desired positions with respect to a circuit board and the assembly is then immersed in a bath of vapour, the latent heat of condensation of which causes the solder to melt and flow, thus securing the component to the board. Alternatively or additionally, the component to be soldered may be the circuit board itself.

There are a number of publications describing this technique, which was developed by the Western Electric Company. Thus it is described in the journal "Tin and its Uses" No. 130 (1981) pages 1–3 and also in Electronic Production, June 1980 pages 21–27.

However, one of the problems connected with this technique is that of selecting a suitable material for the production of the bath vapour. An ideal material should desirably have the following properties:

a. a suitable boiling range, i.e. sufficient to melt the solder
b. chemically inert in the vapour phase in the presence of metals, glass, ceramics and polymeric materials etc.
c. safe to handle and not liable to produce toxic or corrosive substances during its evaporation/condensation cycle in the presence of metals, glass, ceramics, and polymeric materials, and moisture
d. recoverable by condensation
e. non-flammable
f. of high-vapour density to form a heavy layer in the vessel
g. excellent dielectric properties
h. not leaving residues after evaporation
i. melts below room temperature.

The use of various fluids in this context is described in the two references referred to above. However, the prior art fluids do not meet all the above criteria. The biggest outstanding problems are the formation of (1) perfluoroisobutylene (pfib) and (11) acidic products, e.g. hydrogen fluoride, during the course of the evaporation/condensation cycle used in the vapour-soldering technique. These problems are referred to in the second of the references cited above. Perfluoroisobutylene is highly toxic (time-weighted average threshold limit value for an 8-hour work-day=0.01 ppm).

We have now found that a particularly effective and safe vapour-phase soldering technique can be devised if the essential heat-transfer vapour involved in the process is composed predominantly of perfluorotetradecahydrophenanthrene ($C_{14}F_{24}$).

The present invention provides a method of soldering wherein a component to be soldered is immersed in a vapour bath to melt the solder, and the component is then withdrawn from the vapour bath, wherein the vapour bath is composed predominantly of perfluorotetradecahydrophenanthrene ($C_{14}F_{24}$).

Preferably there is used a component which carries a solder having a melting point below 200° C. The solder used may be a 60/40 tin/lead solder.

It will be appreciated that the component to be soldered may be any component having applied thereto or carrying a solder which may flow when melted by the heat of the vapour phase. As indicated previously, such a component may for example be a printed circuit board or one or more soldered items such as preforms to be applied to a circuit board. Such components (i.e. circuit board and preforms) would usually be treated together by the method of the invention i.e. in the same vapour bath, but it is nevertheless envisaged that the components could be separately treated in the vapour bath and subsequently joined together.

The preparation and physical properties of the perfluorotetradecahydrophenanthrene are well documented in the chemical literature (see for example U.S. Pat. No. US-A-2459780 and Tetrahedron 19 (12) 1893-1901 (1963)). The boiling point of the material and its other relevant physical properties can be summarised as follows:

Molecular weight—624
Density, kg/l (liquid)—2.03
Vapour density, (g/l)—24.8 (STP)
Boiling point, °C.—215
Pour point(typical), °C.—Ca-20
Electrical resistivity (minimum)—$10^{13}$ ohm.cm
Dielectric strength (minimum)—13 KV/mm.

It has now been determined, experimentally, that in a series of evaporation/condensation cycles in the presence of solder alloys and polymeric materials, the production of perfluoroisobutylene from the perfluorotetradecahydrophenanthrene is non-detectable using gas chromatography (limit 1 part in $10^{10}$ by weight) with an electron-capture detector linked to a mass spectrometer, compared with the greater that 0.1 ppm of pfib found with a known vapour-phase soldering fluid (a perfluorinated tertiary amine commercially known as Fluorinert (R.T.M.) FC70) using the same separation/detection techniques (see Turbini and Zado, Electronic Production, June 1980, pages 21 to 27).

The perfluorotetradecahydrophenanthrene is suitable for use with solders melting below 200° C. Typical solder compositions which may be used in the method according to the invention are given below:

| Solder Composition (wt %) | | | | | |
|---|---|---|---|---|---|
| Sn | Pb | Sb | Ag | Cd | Melting Point/range (°C.) |
| 62 | 35.7 | 2.0 | 0.3 | | 179 |
| 60 | 40 | | | | 183–188 |
| 51.2 | 30.6 | | | 18.2 | 145 |

The invention will now be further illustrated by reference to the following non-limiting Examples in which:

Example 1 describes the use of perfluorotetradecahydrophenanthrene when used as a vapour phase soldering fluid in five instances (a) to (e) in the method according to the invention;

Example 2 describes the analytical procedure used to determine the pfib content of fluid vapour, for the fluid to be used in the method according to this invention (designated Flutec (R.T.M.) PP11 in the Examples) in comparison with a prior art fluid (Fluorinert FC 70).

Example 3 illustrates the relative thermal stability of the fluid to be used in the method according to the invention compared with a prior art fluid (Fluorinert FC70).

EXAMPLE 1

Flutec PP11 (perfluorotetradecahydrophenanthrene) (10 kg) was poured into a Hybrid Technology Company "Phase 4" vapour phase soldering tank. The liquid was heated to boiling and a vapour layer was established (after about 20 mins. at 3.5 Kw power input). Trichlorotrifluoroethane (about 10 ml) was then poured into the tank to form a secondary vapour zone, above the Flutec PP11 vapour.

At this stage the heater control was set on 'low'. The following tests were then conducted:

1. (a) 74 connectors were inserted in a tin-lead through-plated board and 60/40 Sn/Pb solder-ring preforms were fitted. 26 of the connectors were gold plated and the remainder were tin-lead plated. The assembly was lowered into the Flutec PP11 vapour for a total dwell time of 20 seconds, followed by a 1 minute dwell in the secondary vapour zone. The assembly was removed for inspection and all joints were found to be satisfactorily soldered by visual inspection.
   (b) The above test was repeated using 28 gold-plated connectors and 56 tin-lead plated connectors. All joints were found to be satisfactorily soldered.
   (c) Two 'chip carriers', each having eighteen solder paste (tin-lead, 60/40) coated connectors, were placed on corresponding tin-lead (60/40) coated pads on a ceramic substrate. The assembly was lowered into the Flutec PP11 vapour zone for 20 seconds, followed by a one minute dwell in the secondary vapour zone. All joints were found to be satisfactorily soldered.
   (d) The above test was repeated, except that a chip carrier was placed on each side of a horizontally orientated ceramic substrate, the lower chip being fixed in place by surface tension. All joints were found to be satisfactorily soldered by visual inspection.
   (e) A tin-lead solder (60/40) coated printed circuit board, 15 cm × 10 cm, was cleaned with hydrochloric acid, rinsed with distilled water and dried with absorbent paper. The circuit board was then lowered for 30 seconds into the Flutec PP11 vapour zone, followed by a dwell time of 1 minute in the secondary vapour zone. Satisfactory reflow of the tin-lead occurred, i.e. the solder flowed over the circuit board.

EXAMPLE 2

An evaporation tank was filled with vapour phase soldering fluid to a depth of about one inch (2.5 cm) above the level of immersion heaters. A copper cooling coil was fixed so that it was about three inches (7.6 cm) above the liquid level and water flow was turned on. The heaters were switched on full to start with and then back to about half power once the boiling had commenced and a vapour layer had been established at cooling coil level.

The system was sampled at a level three inches (7.6 cm) above the vapour layer, at half hourly intervals over a period of four hours.

Analysis of the samples for pfib (perfluoroisobutylene) was performed using a gas chromatograph with electron capture detector and a gas sample valve equipped with a 5 cc sampling loop. A 12 ft.×⅛ inch (366×0.3 cm) Carbowax 400/Porasil C, 100–120 mesh column was used. Analytical procedures included an initial column temperature hold at 60° C. for 10 minutes, followed by temperature programming at the rate of 20°/min up to a maximum of 140° C. The maximum temperature was maintained until all high boilers had eluted from the column and the detector had cleaned off (1½ to 2 hours). The detector temperature was maintained at 325° C. Further, the glc column was linked to a mass spectrograph. This increased the sensitivity for perfluoroisobutylene, down to a detection limit of 0.0001 ppm by weight pfib.

Using boiling Flutec PP11 in the test tank described above, no perfluoroisobutylene could be detected.

L. J. Turbini and F M Zado (Electronic Production, June 1980, pages 21 to 27), using a similar system filled with the perfluorinated tertiary amine Fluorinert FC70, found significant levels of pfib in the vapour (eg 0.14 ppm pfib in one example and greater than 1 ppm pfib in a second).

EXAMPLE 3

Flutec PP11 (perfluorotetradecahydrophenanthrene) was compared with Fluorinert FC70 by the following method:

The two separate liquids (200 ml. each) were heated under reflux in glass apparatus in the presence of copper filings (1 gm.). Samples were taken at 2 h., 8h., and 16 h intervals and compared for reactive fluoride (expressed as F') and acidity (HF) content. The results are given below:

| | FC70 | | PP11 | |
|---|---|---|---|---|
| Reflux Time | F', $\mu g./ml.$ | Acidity, $\mu equiv./ml.$ | F', $\mu g./ml.$ | Acidity, $\mu equiv./ml.$ |
| Start | 2 | N.D. | 1 | N.D. |
| 2 hrs. | 39 | — | 1 | — |
| 8 hrs. | 95 | — | 1 | — |
| 16 hrs. | 68 | 0.54 | 1 | N.D. |

In order to simulate the practical situation more closely, Flutec PP11 and Fluorinert FC70 were compared in a laboratory vapour phase soldering tank. In this unit the liquid was in direct contact with metal heating elements and the vapour was condensed by means of water-cooled copper coils.

Each liquid was separately heated under reflux for 4 hours followed by measurement of acidity and reactive fluoride concentration. The results are given below.

| | Acidity, $\mu equiv./ml.$ | | F', $\mu g./ml.$ | |
|---|---|---|---|---|
| Liquid | Before Reflux | After Reflux | Before Reflux | After Reflux |
| FC70 | N.D. | 0.04 | 2 | 30 |
| PP11 | N.D. | N.D. | 1 | 1 |

N.D. = Not detectable.

Conclusion

Flutec PP11 is significantly more stable than Fluorinert FC70 when used for vapour phase soldering.

We claim:

1. In a method of soldering wherein a component to be soldered is immersed in a vapour bath to melt the solder, and the component is then withdrawn from the vapour bath, the improvement comprising that the vapour bath is composed predominantly of perfluorotetradecahydrophenanthrene ($C_{14}F_{24}$).

2. The method of claim 1, wherein there is used a component which carries a solder having a melting point below 200° C.

3. The method according to claim 2, wherein the solder used is a 60/40 tin/lead solder.

* * * * *